Patented Aug. 14, 1945

2,382,441

UNITED STATES PATENT OFFICE 2,382,441

MANUFACTURE OF PHTHALOCYANINE PIGMENTS

William B. Reynolds, Elmhurst, and Sylvester A. Scully, Yonkers, N. Y., assignors to Interchemical Corporation, New York, N. Y., a corporation of Ohio No Drawing. Application May 1, 1941,
Serial No. 391,352

3 Claims. (Cl. 260—314.5)

This invention relates to the manufacture of phthalocyanine pigments, and is particularly directed at a new and improved process for the manufacture of such pigments.

The phthalocyanine pigments are conventionally made by reacting an aromatic ortho dinitrile, or some compound capable of producing such a product in situ (e. g., an aromatic ortho dicarboxylic acid, etc.) with a metal, with or without a solvent or other catalyst. The crude reaction mixture is ordinarily dissolved in concentrated sulfuric acid, and a purified pigment is obtained by dropping the acid solution into water to obtain the purified pigment.

Perhaps the simplest method of making the crude pigment is to react a fused ortho dinitrile such as phthalonitrile with a metal or metal salt. The reaction is induced by heat, but once set off is violently exothermic. It has the advantage of low cost and rapid reaction rate; but it requires a high temperature to initiate reaction (e. g., copper or a copper salt and phthalonitrile require 200° C.), and the exothermic reaction is uncontrolled, so that very high temperatures are attained, resulting in considerable tendency to produce undesirable by-products of the reaction, which reduce recoveries of purified pigment.

The use of certain solvents has been found to reduce the reaction temperature necessary, as disclosed in the Turek U. S. Patent No. 2,138,413, issued November 29, 1938; the solvents found most satisfactory include the aliphatic polyhydric alcohols and alcohol ethers derived from them. The process utilizing these poly alcohols and alcohol ethers results in lower reaction temperatures and higher yields; but the process is slower than the fusion process, and it is necessary to recover the solvents used, and sufficient solvent is lost in recovery and in washing of the pigment so that from 1 to 1½ pounds of solvent are lost for every pound of pigment produced.

We have discovered that unusually effective results can be obtained by reacting an aromatic ortho dinitrile with a metalliferous reactant, in the presence of such limited quantities of selected solvents that the heat developed by the exothermic reaction is sufficient to evaporate the major portion of the solvent, while allowing some of the solvent to remain and effectively control the top temperature.

The solvent must be chosen from those which favor the metallization reaction to such a degree that the exothermic phase thereof is initiated below the boiling point of the solvent; these include water-miscible hydroxy aliphatic solvents having at least two polar groups, with boiling points between 125 and 300° C. Satisfactory highly polar aliphatic hydroxy compounds falling within this group of solvents include glycol, propylene glycol, glycerol, diethylene glycol, triethylene glycol, other polyglycols, and the water-soluble nitro-paraffine alcohols having the proper boiling points.

Preferably, the metal is converted into a complex soluble in the solvent, as for example the complexes obtained with copper and ammonia or urea. Satisfactory results are not, however, dependent on using this form of the metal—a suspension of cuprous oxide, for example, will give rapid low-temperature reaction.

The amount of solvent used, as compared to nitrile, is sufficiently high so that the nitrile goes into complete solution to give a liquid which can be readily stirred with the metalliferous reactant, but is sufficiently low so that the heat of the exothermic reaction will evaporate sufficient of the solvent to give a solid or pasty mass still containing some solvent. This ratio of solvent is between about 1 of solvent to 2 of nitrile, and 2 of solvent to 1 of nitrile; most preferably, about equal quantities are used. By so choosing the amounts of solvent, reaction is induced at a temperature well below that obtained in the absence of solvent; and the heat absorbed in evaporating the solvent prevents the temperature from reaching the levels of the masses obtained by the fusion process. In spite of the control of temperature, the reaction proceeds with considerable violence, being complete in a few minutes, thus comparing in speed most favorably with the fusion method.

All of the improvements of lower reaction temperature and control, obtained by the conventional solvent process, as compared with the fusion method, are obtained with our process. At the same time, we have greatly increased the production rates both as compared to the fusion method and as compared to the conventional solvent method—our process is completed in five minutes or so, as compared to considerably longer periods for the other processes. A second advantage is the low heat requirement of our method—we need heat only a small amount of solvent to reaction temperature, and the reaction proceeds without additional heat input; in the case of the fusion process, the dinitrile must be heated to 200° C. or thereabouts, and fused as well, while the Turek solvent process requires continuous heating. A third advantage over both processes is the ease of after-treatment—instead of a sintered mass which must be allowed to cool and then broken up, or a solution which must be treated to recover the solvent, we can regulate our reaction to get a paste or porous solid which can easily be leached. Furthermore, as compared to the Turek process, there is actually less solvent used up, while avoiding the expense of recovering solvent—the total loss of an amount of solvent equal to the weight of dinitrile compares very favorably with the losses of 100 to 150% in the conventional process.

Typical examples of our invention are the following:

Example 1

|  | Grams |
|---|---|
| Phthalonitrile | 102 |
| Ethylene glycol | 30 |

Heat to 140° C. in a tall one-liter beaker. The phthalonitrile goes into solution and agitation is started at approximately 100° C. Add rapidly to the above a complex prepared by heating—

|  | Grams |
|---|---|
| Cuprous chloride | 24 |
| Urea | 15 |
| Ethylene glycol | 70 |

After a time lag of 40 to 60 seconds, a vigorous reaction takes place. The temperature rises rapidly to the boiling point of the glycol, and the bulk of the glycol is eliminated. After several minutes 1000 ml. of water is added, and after stirring for 5 to 10 minutes the batch is filtered, washed, and dried. The dry crude is acid-pasted from sulfuric acid in the usual way to give a finished blue pigment. Yield, 90%.

Example 2

|  | Pounds |
|---|---|
| Phthalonitrile | 102 |
| Ethylene glycol | 30 |

Heat to 140° C. in a suitably agitated pot, whereupon the phthalonitrile goes into solution. To this solution is added the complex prepared by heating—

|  | Pounds |
|---|---|
| Cuprous chloride | 21.5 |
| Ethylene glycol | 70.0 | while bubbling ammonia through the mixture. After a short time lag a violently exothermic reaction takes place with the formation of copper phthalocyanine. Water is cautiously added and stirred into the pigment to form a filterable slurry. The press cake is washed with water, dried, acid pasted and isolated in the accepted manner. The yield approximates 90% of theory.

Example 3

Similar results are obtained by the use of cuprous oxide in place of cuprous chloride.

Example 4

| Phthalonitrile | 102 grams, 0.8 mol |
|---|---|
| Ethylene glycol (distilled) | 30 ml. |

Heat to 140° C., and add a sodium glycollate solution prepared by dissolving 5.5 grams of metallic sodium in 120 ml. glycol and warming to 170° C. A vigorous reaction takes place, and the solution sets to a pasty mass. This is boiled with water and filtered. Then the water-insoluble material is extracted with boiling acetone and with boiling alcohol to give pure metal-free phthalocyanine in 50% yield.

Example 5

Example 1 may be reproduced, substituting 45 grams of cobalt chloride for the cuprous chloride. Cobalt phthalocyanine is produced.

Examples can of course be multiplied indefinitely, since the method may be used to produce any phthalocyanine pigment; it is only necessary to use a solvent which permits the exothermic reaction to be initiated below its boiling point, and to use it in such quantity that the major portion of the solvent is lost. The product resulting depends, of course, on the original reactants—with metals such as cobalt, iron, copper and the like, metallic phthalocyanines are obtained, while non-metallic pigments are obtained with certain other metals (e. g., sodium). The various aromatic ortho dinitriles yield products of varying colors and properties, in known manner.

We claim:

1. The method of preparing a phthalocyanine, which comprises reacting an aromatic orthodinitrile with a metalliferous reactant whose reaction with the nitrile in the absence of diluents is violently exothermic, in the presence of a liquid consisting essentially of 50-200%, based on the weight of the nitrile, of a water-miscible hydroxy aliphatic solvent for the dinitrile having at least two polar groups, and a boiling point between 125 and 300° C., heating the reaction mixture to a point below the boiling point of the solvent, but sufficient to start the exothermic reaction, allowing the exothermic reaction to proceed to completion without further extraneous heat, while permitting the solvent to be freely volatilized to produce, because of the proportion of solvent to nitrile, a finished reaction mass which is pasty because it contains only a small proportion of residual solvent, and is at a temperature no higher than the boiling point of the solvent, the reaction being characterized by the fact that it is complete in about the same period as that required for the reaction of the metalliferous reactant with the undiluted dinitrile in fused condition, and thereafter recovering pigment from the reaction mass.

2. The method of preparing copper phthalocyanine, which comprises reacting phthalonitrile with a cupriferous reactant whose reaction with the nitrile in the absence of diluents is violently exothermic, in the presence of a liquid consisting essentially of 50-200%, based on the weight of the nitrile, of a water-miscible hydroxy aliphatic solvent for the dinitrile having at least two polar groups, and a boiling point between 125 and 300° C., heating the reaction mixture to a point below the boiling point of the solvent, but sufficient to start the exothermic reaction, allowing the exothermic reaction to proceed to completion without further extraneous heat, while permitting the solvent to be freely volatilized to produce, because of the proportion of solvent to nitrile, a finished reaction mass which is pasty because it contains only a small proportion of residual solvent, and is at a temperature no higher than the boiling point of the solvent, the reaction being characterized by the fact that it is complete in about the same period as that required for the reaction of the metalliferous reactant with the undiluted dinitrile in fused condition, and thereafter recovering pigment from the reaction mass.

3. The method of preparing copper phthalocyanine which comprises reacting phthalonitrile with a cupriferous reactant, whose reaction with the nitrile in the absence of diluents is violently exothermic, in the presence of a liquid consisting essentially of 50-200%, based on the weight of the nitrile, of ethylene glycol, heating the reaction mixture to a point below the boiling point of the glycol but sufficient to start the exothermic reaction, allowing the exothermic reaction to proceed to completion without further extraneous heat while permitting the solvent to be freely volatilized, to produce, because of the proportion of solvent to nitrile, a finished reaction mass which is pasty because it contains only a small proportion of residual glycol, and is at a temperature no higher than the boiling point of the glycol, the reaction being characterized by the fact that it is complete in about the same period as that required for the reaction of the metalliferous reactant with the undiluted dinitrile in fused condition, and thereafter recovering pigment from the reaction mass.

WILLIAM B. REYNOLDS.
SYLVESTER A. SCULLY.